US012225842B2

(12) United States Patent
Evertz et al.

(10) Patent No.: US 12,225,842 B2
(45) Date of Patent: Feb. 18, 2025

(54) APPARATUS INCLUDING AN AUTONOMOUS ROBOT APPARATUS FOR MOWING GRASS

(71) Applicant: BRUEGGLI, Romanshorn (CH)

(72) Inventors: Joerg Evertz, Birmensdorf (CH); Simon Hasenfratz, Zurich (CH); Uwe Werner, Huetten (CH)

(73) Assignee: BRUEGGLI, Romanshorn (CH)

( * ) Notice: Subject to any disclaimer, the term of this patent is extended or adjusted under 35 U.S.C. 154(b) by 785 days.

(21) Appl. No.: 17/430,183

(22) PCT Filed: Feb. 10, 2020

(86) PCT No.: PCT/EP2020/053255
§ 371 (c)(1),
(2) Date: Aug. 11, 2021

(87) PCT Pub. No.: WO2020/165068
PCT Pub. Date: Aug. 20, 2020

(65) Prior Publication Data
US 2022/0151142 A1    May 19, 2022

(30) Foreign Application Priority Data
Feb. 11, 2019  (DE) ..................... 10 2019 103 335.7

(51) Int. Cl.
*A01D 34/00*    (2006.01)
*A01D 34/73*    (2006.01)
(Continued)

(52) U.S. Cl.
CPC .......... *A01D 34/008* (2013.01); *A01D 34/73* (2013.01); *A01D 34/863* (2013.01); *A01D 2101/00* (2013.01)

(58) Field of Classification Search
CPC .... A01D 34/008; A01D 34/73; A01D 34/863; A01D 2101/00; A01D 34/44; A01B 39/166
See application file for complete search history.

(56) References Cited

U.S. PATENT DOCUMENTS 1,442,032 A * 1/1923 Luce ...................... A01D 45/10
56/53
3,261,150 A * 7/1966 Fitzgerald, Sr. ..... A01D 34/863
56/10.4
(Continued)

FOREIGN PATENT DOCUMENTS

CN    105142388 A    12/2015
CN    206865959 U    1/2018
(Continued)

OTHER PUBLICATIONS

Chen Xin, "The Use of Rice Planting Machinery", Three Gorges Publishing House Agricultural Science and Education Publishing Center, pp. 105-106, May 31, 2008.
(Continued)

*Primary Examiner* — Arpad Fabian-Kovacs
(74) *Attorney, Agent, or Firm* — Caesar Rivise, PC

(57) ABSTRACT

An apparatus for mowing grass. The apparatus has a plurality of cutting devices for mowing the grass. The apparatus has a plurality of carrying arms which are arranged offset with respect to one another with regard to the transverse axis of the apparatus, and are supported such that they can be pivoted up and down in each case individually, and carry in each case one of the plurality of cutting devices. The apparatus has a plurality of supporting elements which support in each case one of the plurality of carrying arms on an underlying surface, and are arranged in front of the respective cutting device with regard to a forward moving direction of the apparatus. The apparatus can have the
(Continued)

advantage that the leading supporting elements do not push any cuttings in front of them, and a risk of the apparatus being jacked up is decreased.

17 Claims, 4 Drawing Sheets

(51) Int. Cl.
*A01D 34/86* (2006.01)
*A01D 101/00* (2006.01)

(56) References Cited

U.S. PATENT DOCUMENTS

| | | | |
|---|---|---|---|
| 3,381,456 A | 5/1968 | Taylor | |
| 3,410,063 A | 11/1968 | Speiser | |
| 3,972,381 A | 8/1976 | Gail | |
| 4,194,575 A * | 3/1980 | Whalen | A01B 35/16 |
| | | | 172/551 |
| 4,528,920 A * | 7/1985 | Neumeyer | A01C 7/205 |
| | | | 111/926 |
| 4,531,589 A | 7/1985 | Williams | |
| 4,573,306 A | 3/1986 | Smith et al. | |
| 5,343,680 A * | 9/1994 | Reichen | A01D 34/62 |
| | | | 56/294 |
| 6,321,515 B1 | 11/2001 | Colens | |
| 6,336,312 B1 * | 1/2002 | Bednar | A01D 34/74 |
| | | | 56/13.6 |
| 6,928,798 B2 * | 8/2005 | Hensley | A01D 34/64 |
| | | | 56/14.9 |
| 7,117,660 B1 | 10/2006 | Colens | |
| 7,540,333 B2 * | 6/2009 | Bettin | A01C 7/205 |
| | | | 172/744 |
| 8,386,137 B2 * | 2/2013 | Sauder | A01C 14/00 |
| | | | 715/965 |
| 10,477,760 B2 * | 11/2019 | Bassett | A01M 7/0025 |
| 2004/0148917 A1 * | 8/2004 | Eastwood | A01D 75/306 |
| | | | 56/6 |
| 2008/0093093 A1 * | 4/2008 | Sheppard | A01B 61/046 |
| | | | 172/2 |
| 2012/0216731 A1 * | 8/2012 | Schilling | A01C 7/203 |
| | | | 111/69 |
| 2016/0309641 A1 * | 10/2016 | Taunton | A01B 49/027 |
| 2018/0288939 A1 * | 10/2018 | Bassett | A01D 34/535 |

FOREIGN PATENT DOCUMENTS

| | | | | |
|---|---|---|---|---|
| CN | 107750585 A | | 3/2018 | |
| CN | 207665493 U | * | 7/2018 | ............ A01D 34/64 |
| CN | 108522025 A | | 9/2018 | |
| CN | 208353943 U | * | 1/2019 | ............ A01D 34/64 |
| CN | 110996651 A | * | 4/2020 | ........... A01D 34/008 |
| DE | 2642586 A1 | | 4/1977 | |
| DE | 31 08 614 A1 | | 4/1982 | |
| DE | 19612092 A1 | | 10/1997 | |
| DE | 10122407 A1 | | 10/2002 | |
| DE | 102015222376 A1 | | 5/2017 | |
| EP | 1597954 A1 | | 11/2005 | |
| EP | 2189054 A1 | * | 5/2010 | ........... A01D 34/863 |
| EP | 2241172 | | 10/2010 | |
| EP | 2957162 A1 | * | 12/2015 | ........... A01D 34/006 |
| GB | 2081563 A | | 2/1982 | |
| GB | 2482467 A | | 2/2012 | |
| TW | M481584 U | | 7/2014 | |
| WO | WO2011/115536 A1 | | 9/2011 | |

OTHER PUBLICATIONS

Search Report from corresponding Chinese Patent Application No. 202080021322.8 dated Mar. 29, 2023.
English abstract of CN107750585A.
English abstract of DE10122407A1.
English abstract of DE102015222376A1.
English abstract of DE19612092A1.
English abstract of DE2642586A1.
International Search Report for corresponding PCT Application No. PCT/EP2020/053255 dated Apr. 6, 2020.
Search Report for related German Patent Application No. 102019103355.7 dated Oct. 31, 2019.
English abstract of CN105142388A.
English abstract of CN108522025A.
English abstract of CN206865959U.
Search Report of Chinese Patent Application No. 202080021322.8 dated Oct. 31, 2022.

* cited by examiner

APPARATUS INCLUDING AN AUTONOMOUS ROBOT APPARATUS FOR MOWING GRASS

CROSS-REFERENCE TO RELATED APPLICATIONS

This application is a U.S. National Phase Application under 35 U.S.C. § 371 of PCT/EP2020/053255, filed Feb. 10, 2020, which claims priority from DE 102019103335.7, filed Feb. 11, 2019, the contents of which applications are incorporated herein by reference in their entireties.

BACKGROUND OF THE INVENTION

The invention relates to an apparatus, preferably an autonomous robot apparatus, for mowing grass, with a plurality of cutting devices for mowing the grass.

Nowadays, fruit orchards, such as, for example, apple tree orchards and vineyards, are typically mown every three to four weeks by a tractor with a connected mowing apparatus/mulch apparatus. The trees or bushes of the orchards are typically arranged in rows which lie next to one another (what are known as row crops). The fruit grower drives the tractors successively through the spaces between the rows which lie next to one another, and mows the grass in the process. This requires a considerable time and cost outlay for the fruit grower. The mowing work and mulch work are necessary, in order that there are no delays in the harvest and the paths between the trees or bushes can be driven along without problems.

In the prior art, robot apparatuses for mowing grass and/or for use in agriculture are known. Ultimately, however, said robot apparatuses have a very wide variety of shortcomings, with the result that they can currently scarcely be used in agriculture.

U.S. Pat. No. 7,117,660 B1 discloses a self-propelled lawnmower with a microprocessor and at least one cutting tool, an elastic stressing element being provided which is connected to the frame of the lawnmower and the at least one cutting tool. A central automatic setting means of the height of the cutting tool in relation to the ground is likewise provided. The cutting tools consist of a rotary disk with retractable knives which are provided with a stop below the underside in the form of a central extension which can come into contact with the ground.

U.S. Pat. No. 6,321,515 B1 discloses a self-propelled lawnmower and a method for using the machine. The machine comprises a movable frame with at least one drive wheel and, on its underside, at least two cutting tools which are arranged next to one another and are assigned to in each case one electric motor. A carrier chassis is connected mechanically at the front to five identical cutting heads which are situated on two lines and are offset with respect to the movement direction in relation to the perpendicular, in order for it to be possible for a substantial part of the width of the mower to be covered. Furthermore, flexible fastening means for the cutting heads and two drive wheels which are driven by electric motors are included.

It can be a disadvantage of known apparatuses, for example, that the cutting result is not uniform over a plurality of cutting devices, a non-uniform distribution of the cut lawn takes place by way of the mowing apparatus, and/or the mowing apparatus tends to be jacked up if it makes contact with obstacles.

SUMMARY

The invention is based on the object of providing an alternative and/or improved apparatus for mowing grass.

The object is achieved by way of the features of independent claim 1. Advantageous developments are specified in the dependent claims and the description.

The invention provides an apparatus (which is, for example, self-propelled), preferably an autonomous robot apparatus, for mowing grass. The apparatus has a plurality of (for example, driven) cutting devices for mowing the grass. The apparatus has a plurality of carrying arms which are arranged offset with respect to one another with regard to the transverse axis of the apparatus, are mounted (for example, on a main body or frame of the apparatus) such that they can be pivoted up and down (can be pivoted upward and downward) in each case individually, and carry in each case one of the plurality of cutting devices. The apparatus has a plurality of supporting elements which support in each case one of the plurality of carrying arms on an underlying surface, and are arranged in front of (and expediently spaced apart from) the respective cutting device with regard to a forward moving direction of the apparatus.

The apparatus can have the advantage that the leading supporting elements do not pass through grass which has been cut by the cutting devices and therefore do not push any cuttings in front of them, which might lead to an undesired pile formation or therefore ultimately even to jacking up of the apparatus. Furthermore, a spacing which is as great as possible between the pivot bearing of the carrying arms and the supporting elements very generally has an advantageous effect on the risk of the apparatus being jacked up. The individual suspension of the cutting devices can be advantageous with regard to a uniform cutting result, since a pivoting movement up and down of the carrying arms and therefore of the cutting devices expediently follows a contour of the underlying surface below the respective supporting element.

The cutting devices are expediently driven cutting devices which, for example, in each case have a dedicated drive motor (for example, electric motor).

In one exemplary embodiment, the plurality of supporting elements are configured as runners which are preferably horn-shaped and/or curved. In comparison with wheels as supporting elements, for example, runners can have the advantage that they do not become clogged with dirt and grass and can be produced simply.

In a further exemplary embodiment, the plurality of supporting elements are connected rotatably to the respective carrying arm. The respective rotational axis of the plurality of supporting elements can preferably run parallel or obliquely with respect to a vertical axis of the apparatus, and can particularly preferably be inclined forward with regard to the forward moving direction (for example, in an angle between 0° and 15° with respect to the vertical axis). The rotatable connection makes it possible that the supporting elements can corotate when moving around bends or can reverse rotation in the case of reverse moving. A slight inclination with respect to the vertical axis can decrease the risk of jacking up of the apparatus. In the case of reverse moving of the apparatus, for example on account of an obstacle, the carrying arms can be raised by way of the rotational axis of the supporting elements which is inclined toward the front. The apparatus can thus release itself more simply from an obstacle which is present in the cutting region. In the case of lateral pivoting or steering of the apparatus, the slight raising can likewise be advantageous, in order to avoid unintended, excessively low cutting (grass locally very short/too short, or even cut as far as into the soil), in particular if there are depression grooves/tracks which are produced by way of tractors.

In a further exemplary embodiment, furthermore, the apparatus has a main body or frame, on which the plurality of supporting arms are mounted such that they can be pivoted up and down in each case individually, and/or to which drive elements, preferably wheels or caterpillar drives, are attached which are drive-connected to a drive unit (for example, electric motor) of the apparatus.

In one embodiment, the pivot bearings and the plurality of supporting elements are arranged in each case on opposite end regions of the plurality of carrying arms. In this way, a spacing between the pivot bearings and the supporting elements can become as great as possible, which can decrease the risk of jacking up of the apparatus.

In a further embodiment, the plurality of cutting devices have in each case at least one cutting element (for example, a cutting knife) which can be rotated about a cutting axis of the respective cutting device. The cutting axis preferably runs obliquely with regard to a vertical axis of the apparatus. The cutting axis is particularly preferably inclined forward with regard to the forward moving direction (for example, at an angle between 0° and 15° with respect to the vertical axis). As a result of the inclination of the cutting devices, cutting of the lawn can take place only in the front region of the respective cutting device, but not behind this. The cutting elements therefore do not make contact with the lawn which has already been mown, or scarcely make contact with it, with the result that less (for example, electric) energy can be necessary for driving the cutting elements.

The cutting axis of the cutting device can expediently correspond to a rotational axis of a drive unit (for example, electric motor) of the cutting device.

In a further embodiment, the plurality of cutting devices in each case have a stationary part and a rotatable part which are spaced apart from one another by way of a parting line. A region of the stationary part, which region adjoins the parting line, preferably tapers in a direction away from the parting line, and/or a region of the rotatable part, which region adjoins the parting line, tapers in a direction away from the parting line. This configuration can form a protection means against winding (around) of the parting line, which can decrease the risk of the rotatable part being jammed by way of cuttings. Permanent soiling can thus also be prevented.

For example, an external diameter of the stationary part and an external diameter of the rotatable part can widen toward the parting line.

In one design variant, furthermore, the apparatus has a plurality of carrying arm prestressing elements, preferably springs, which are assigned to in each case one of the plurality of supporting arms and prestress the respective carrying arm for pivoting up. In this way, the respective supporting element and/or the underlying surface can preferably be relieved.

The carrying arm prestressing elements can expediently be arranged in each case on the pivot bearing of the plurality of carrying arms.

In a further design variant, furthermore, the apparatus has at least one tactile sensor arm which is arranged, preferably such that it can be pivoted in and out, on a longitudinal outer side of the apparatus for the tactile detection of a spacing between the apparatus and an object (for example, a plant or tree) next to the apparatus. One advantage of the tactile sensor arm in comparison with, for example, optical systems for spacing monitoring is, for example, the smaller sensitivity to contamination. The tactile sensor arm is a sensor system which does not only specify in a binary manner whether a contact with an object has taken place. Instead, the tactile sensor arm makes a determination of a spacing from the object possible. In the case of the use of a suitable evaluation method, shape recognition of an obstacle can also be possible. It can thus be determined, for example, whether an object with a small or great diameter has been touched or whether a planar object (for example, a fence) has been sensed.

It is noted that a presence of the at least one sensor arm and its configuration herein are disclosed independently of a presence and/or a configuration of the plurality of cutting devices, the plurality of carrying arms and/or the plurality of supporting elements. In accordance with a further aspect, the present disclosure therefore also relates to an apparatus, preferably an autonomous robot apparatus, for mowing grass. The apparatus has one or more cutting devices for mowing the grass. Furthermore, the apparatus has at least one tactile sensor arm which is arranged, preferably such that it can be pivoted in and out, on a longitudinal outer side of the apparatus for the tactile detection of a spacing between the apparatus and an object (for example, a plant or tree) next to the apparatus. In each case at least one tactile sensor arm on the two longitudinal outer sides of the apparatus is preferably included.

It is possible that the apparatus has merely one tactile sensor arm. In this way, the apparatus can navigate exactly between two adjacent plant rows, for example in the case of particularly constricted space conditions in row crops (for example, in the case of berry row crops). For example, an additional tactile sensor arm, for example the sensor arm on the left-hand longitudinal outer side, can be an option which can be supplemented in a modular manner.

In one development, furthermore, the apparatus has at least one sensor arm prestressing element which prestresses the at least one tactile sensor arm for pivoting out. As an alternative or in addition, the apparatus can have an electric drive, preferably an electric gimbal drive, which is drive-connected to the at least one tactile sensor arm for pivoting out the at least one tactile sensor arm. A mechanism, particularly preferably a, for example, single-stage planetary gear mechanism, a spur gear mechanism and/or a belt mechanism (for example, with a toothed belt), can be arranged (connected in drive terms) between the electric drive and the tactile sensor arm. The moment of inertia of the tactile sensor arm (moment of inertia of the load) has small effects on the drive.

It is possible that, furthermore, a damping element is provided, in order to damp vibrations of the sensor arm on an end stop. The damping element can be arranged, for example, on the sensor arm or on the end stop.

In one embodiment, the apparatus has, furthermore, an angle sensor which is configured to detect a pivoting angle of the at least one tactile sensor arm. In the case of a plurality of sensor arms, a plurality of angle sensors can expediently also be included, for example in each case one angle sensor per sensor arm.

In a further embodiment, the apparatus has, furthermore, a control unit which is configured to determine a spacing from the object in a manner which is based on a pivoting angle of the at least one tactile sensor arm and/or an angular velocity of a pivoting movement of the at least one tactile sensor arm. The control unit can preferably be configured, furthermore, to navigate the apparatus in a manner which is based on the determined spacing.

Furthermore, the control unit can expediently be configured to additionally determine the spacing in a manner which is dependent on a predefined or known length of the tactile sensor arm.

As used herein, the term "control unit" can expediently relate to an electronic system which, depending on the configuration, can assume control tasks and/or regulating tasks. Even if the term "controlling" is used herein, this can expediently also include as it were "regulating" or "regulating with feedback".

In one exemplary embodiment, furthermore, the apparatus has at least one boom which can be pivoted in and out on a longitudinal outer side of the apparatus. It is possible that the boom is prestressed (for example, spring-prestressed) for pivoting out and/or has a further cutting device for mowing grass. The boom can preferably have a rotatable rolling element which is preferably circular for rolling (running) on objects next to the apparatus. The rolling element can prevent, for example, damage of the objects, in particular in the case of thin tree trunks, as are frequently present in the case of newly planted fruit orchards.

It is noted that a presence of the at least one boom and its configuration herein is disclosed independently of a presence and/or a configuration of the plurality of cutting devices, the plurality of carrying arms and/or the plurality of supporting elements. In accordance with a further aspect, the present disclosure therefore also relates to an apparatus, preferably an autonomous robot apparatus, for mowing grass. The apparatus has one or more cutting devices for mowing the grass. Furthermore, the apparatus has at least one boom which can expediently be pivoted in and out on a longitudinal outer side of the apparatus. It is possible that the boom is prestressed (for example, spring-prestressed) for pivoting out, and/or has a further cutting device for mowing grass. The boom can preferably have a rotatable rolling element which is preferably circular for rolling (running) on objects next to the apparatus. The rolling element can prevent, for example, damage of the objects.

It is possible that the apparatus has an electric drive for pivoting the boom in and/or out. For example, the electric drive can be used only as an emergency function when maneuvering or in order to overcome obstacles, preferably in order to free the apparatus again. Accordingly, for example, an inexpensive electric drive can be used, since it is used only in exceptional cases.

It is possible that the boom and the sensor arm are coupled and/or are integrated into one component.

In a further exemplary embodiment, the rolling element is arranged above the further cutting device and/or has an external diameter which is greater than an external diameter of the further cutting device.

In a further design variant, the boom is additionally mounted such that it can be pivoted up and down, the boom having a further supporting element, preferably configured as a runner, for supporting the boom on the underlying surface, and is preferably prestressed for pivoting up (for example, for relieving the further supporting element and/or the underlying surface).

The apparatus is preferably used in agricultural row crops for mowing grass between the individual plant rows. The apparatus can expediently move parallel to the plant rows.

BRIEF DESCRIPTION OF THE DRAWINGS

The above-described preferred embodiments and features of the invention can be combined with one another in any desired manner. Further details and advantages of the invention will be described in the following text with reference to the appended drawings, in which.

DETAILED DESCRIPTION

The embodiments which are shown in the figures match at least in part, with the result that similar or identical parts are provided with the same designations and, for the explanation thereof, reference is also made to the description of the other embodiments and/or figures, in order to avoid repetitions.

Figure 1:
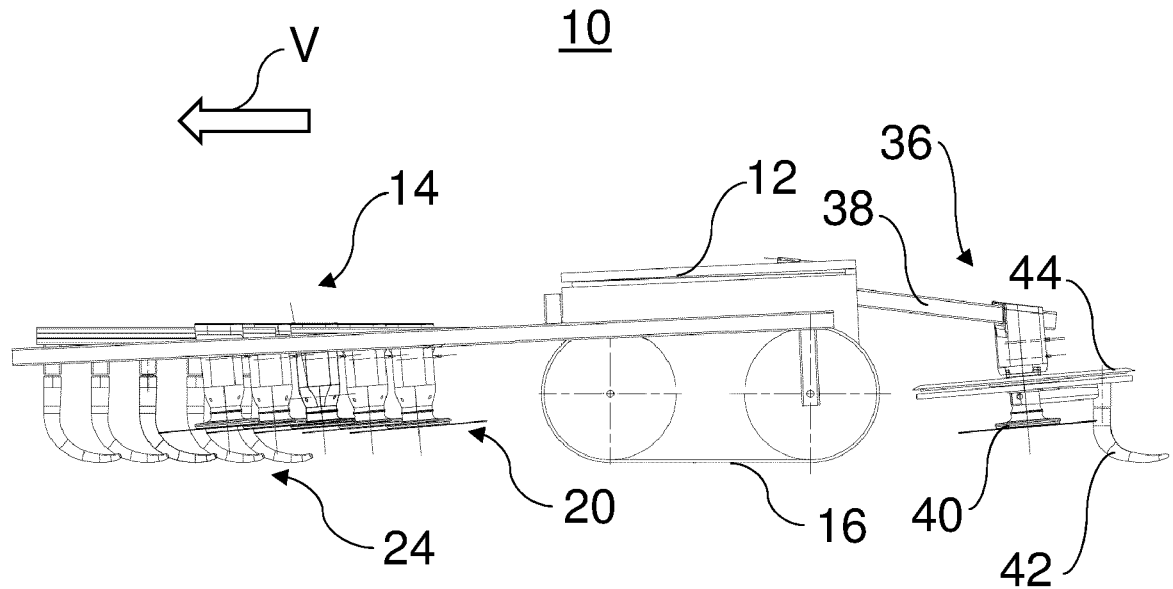
FIG. 1 shows a side view of an apparatus for mowing grass in accordance with one exemplary embodiment of the present disclosure.
Figure 2:
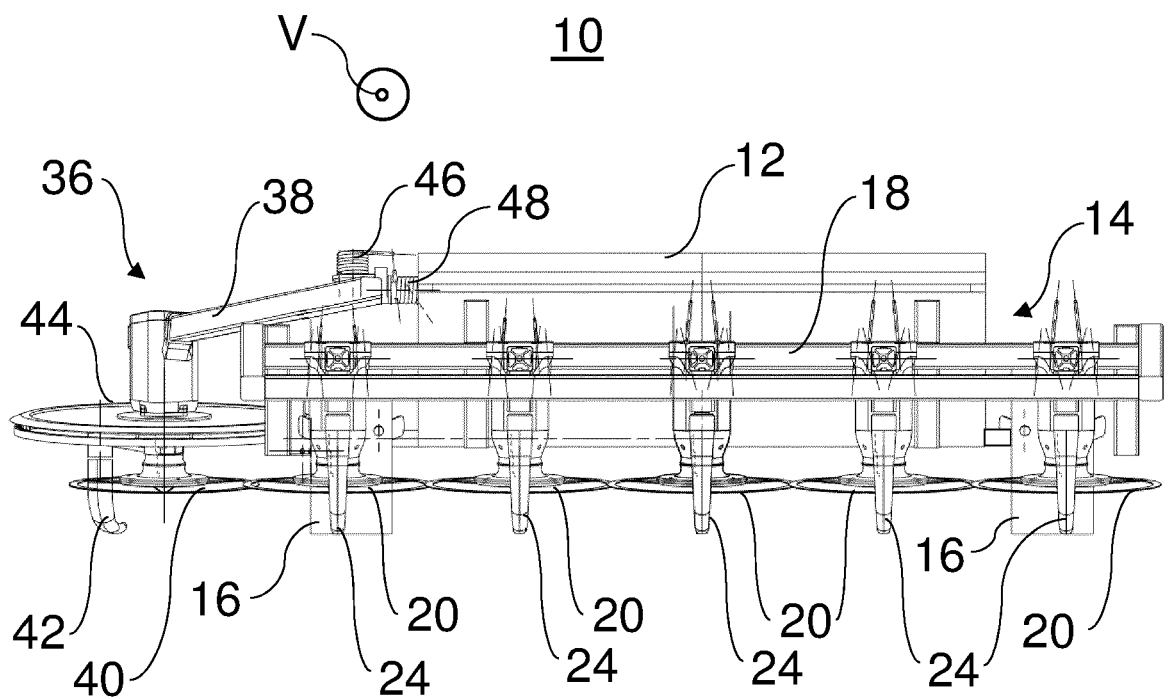
FIG. 2 shows a front view of the exemplary apparatus for mowing grass.
Figure 3:
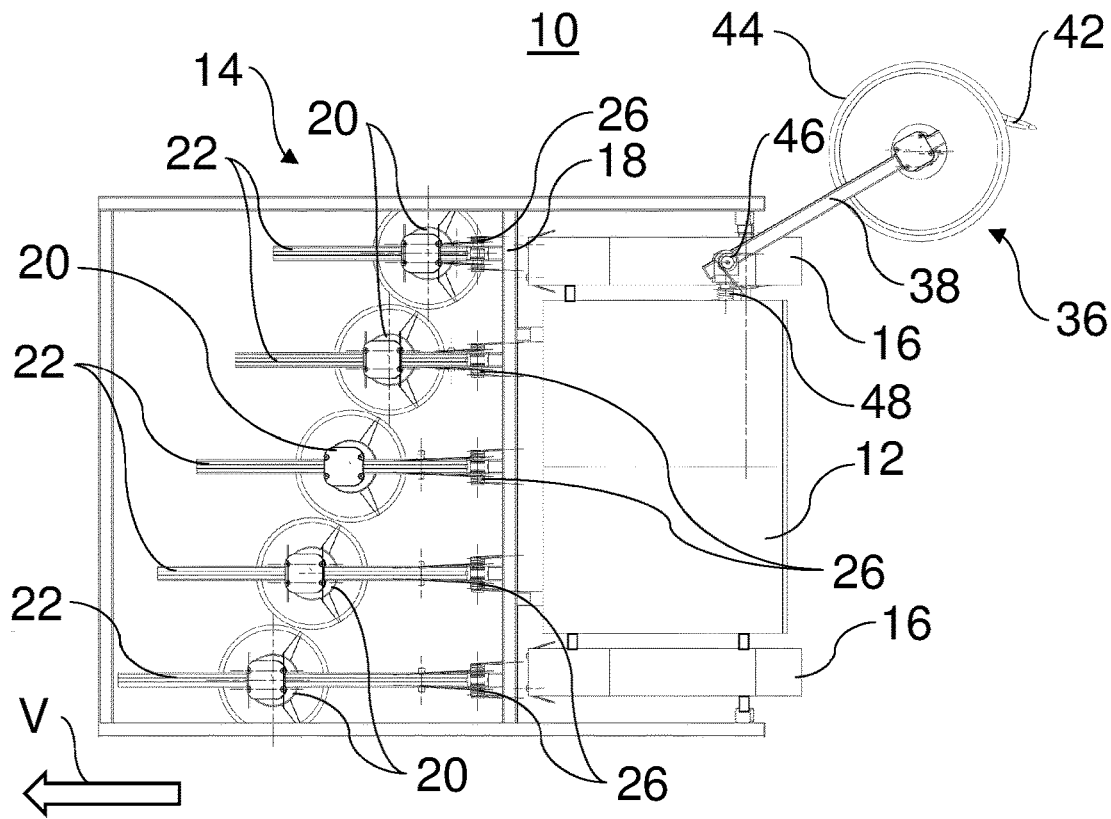
FIG. 3 shows a top view of the exemplary apparatus for mowing grass.
Figure 4:
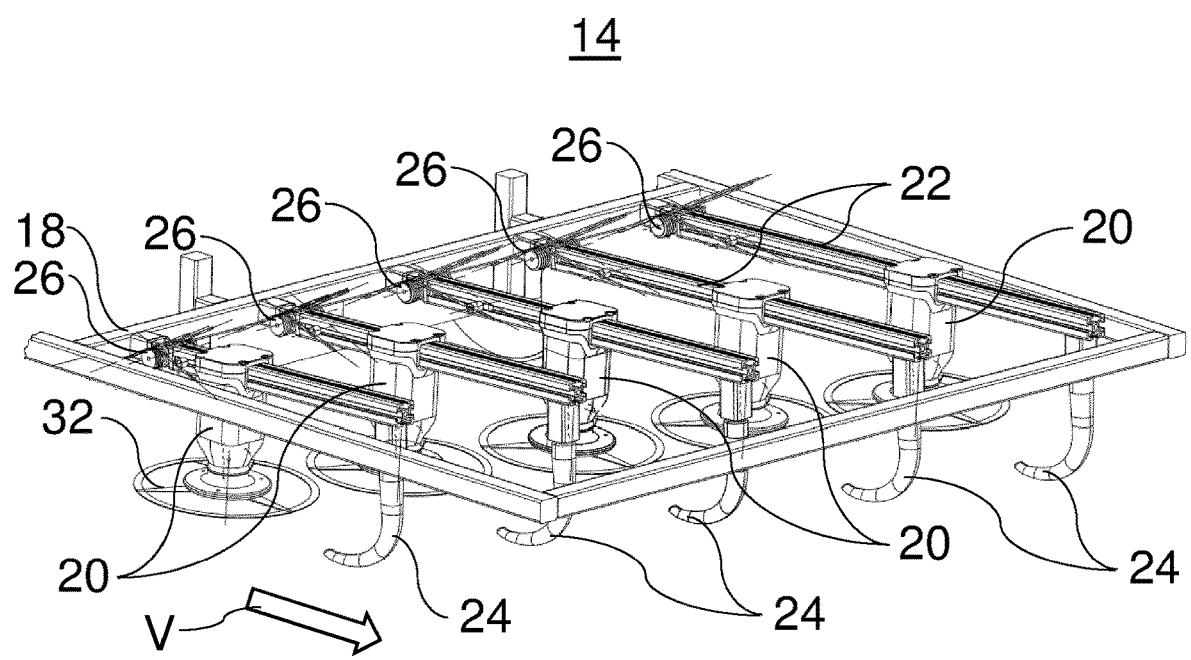
FIG. 4 shows a perspective view of a mowing device of the exemplary apparatus for mowing grass.

FIGS. 1 to 3 show different views of an apparatus 10 for mowing grass. The apparatus 10 for mowing grass can preferably be used between plant rows of agricultural row crops (for example, fruit orchard with tree rows). It is also possible, however, to use the apparatus 10 to mow an open space, such as, for example, on golf courses. The apparatus 10 is expediently configured as an autonomous robot mowing apparatus which can autonomously mow lawns and navigate.

The apparatus 10 has a frame or main body 12 and a mowing device 14.

The main body 12 carries the mowing device 14 in front of it. The main body 12 has a drive unit (not shown), for example an electric motor. The drive unit is drive-connected to drive elements 16. The drive elements 16 are arranged on the longitudinal outer sides of the main body 12. As is shown, the drive elements 16 can be configured, for example, as caterpillar drive units. It is also possible, however, that wheels are used as the drive elements 16. Furthermore, the main body 12 can expediently have a control unit for controlling the apparatus 10.

In the following text, the mowing device 14 is described in greater detail with reference to FIGS. 1 to 4.

The mowing device 14 can have, for example, a rectangular frame which is connected fixedly or pivotably to the main body 12. The mowing device 14 has a plurality of cutting devices 20. In the exemplary embodiment which is shown, five cutting devices 20 are included. The mowing device 14 can also have more or fewer cutting devices 20, however.

The cutting devices 20 can be arranged with respect to one another, in particular, in such a way that cutting regions of adjacent cutting devices 20 overlap partially, with the result that no lawn strip remains between the cutting devices 20. Here, the overlap is set during forward movement of the apparatus 10. The cutting elements of the cutting devices 20 do not make contact with one another in contrast. The common cutting region which is included by the cutting devices 20 can expediently also have the regions in front of the drive elements 16 in the forward moving direction V. The drive elements 16 can therefore already move the apparatus 10 over a mown lawn area.

For example, the cutting devices 20 can be arranged offset with respect to one another with regard to a transverse axis of the apparatus 10 and/or with regard to a longitudinal axis of the apparatus 10. As can be seen in FIG. 3, in particular, the cutting devices 20 can be arranged, for example, along a diagonal of the mowing device 14. Other arrangements are also conceivable, however, for example an arrangement in a linear form, a V-shaped form, a reversed V-shaped form (arrow form), a W-shaped form, an M-shaped form, etc.

The cutting devices 20 preferably all have the same rotational direction. In this way, it can be prevented that grass piles consisting of mown grass are formed between adjacent cutting devices 20. It is also possible, however, that, for example in the case of an arrow-shaped form, rotation is carried out in each case to the outside as viewed from the center. That is to say, cutting devices on one side rotate in an opposed manner with respect to cutting devices on the other side.

Each cutting device 20 is carried on an elongate carrying arm 22 of the mowing device 14. The carrying arms 22 are connected to a crossmember 18 of the mowing device 14 such that they can be pivoted up and down (can be pivoted upward and downward) in each case individually. The pivot axes of the carrying arms 22 can run parallel to a transverse axis of the apparatus 10. The crossmember 18 can be fastened, for example, directly or indirectly to the main body 12 of the apparatus 10. It is also possible that the carrying arms 22 are connected, for example, directly to the main body 12 in a pivotable manner. The pivotable carrying arms 22 expediently form an individual suspension means for the cutting devices 20.

The pivot bearing of the carrying arms 22 is positioned as close to the ground as possible, in order to keep a risk of jacking up of the main body 12 as low as possible. The spacing of the pivot bearings of the carrying arms 22 from the ground can preferably lie in a range between 120 mm and 150 mm or less.

In each case one supporting element 24 is arranged per carrying arm 22 at an end which lies opposite the pivotable bearing of the carrying arms 22. With regard to the forward moving direction V of the apparatus 10, the supporting elements 24 are arranged in front of the pivot bearings of the carrying arms 22 and in front of the cutting devices 20. The cutting devices 20 are arranged in each case between the pivot bearing of the respective carrying arm 22 and the respective supporting element 24.

The supporting elements 24 support the respective pivotably mounted carrying arm 22 on the underlying surface. As a result of the supporting elements 24, a pivoting movement of the carrying arms 22 (and of the cutting devices 20) follows a respective contour of the underlying surface, over which the respective supporting element 24 moves. Here, the pivoting movements of the carrying arms 22 are decoupled from one another, since each carrying arm 22 has a dedicated pivot bearing and is supported on the underlying surface by a dedicated supporting element 24.

In order to relieve the supporting elements 24 and in order to protect the ground, the pivotably mounted carrying arms 22 can be prestressed in a rotational direction away from the underlying surface in each case by means of a prestressing element 26. The prestressing elements 26 can be arranged at the pivot bearing of the carrying arms 22. For example, the prestressing elements 26 can be configured as a spring element.

The supporting elements 24 are expediently configured as runners. The runners can be, for example, horn-shaped and curved. The supporting elements 24 can be connected rotatably to the respective carrying arm 22. The rotatable mounting of the supporting elements 24 makes it possible that the supporting elements 24 can rotate when moving around bends. Here, the rotational axes run parallel or obliquely with respect to the upper axis (vertical axis) of the apparatus 10. It can be advantageous for the supporting elements 24 to be connected to the carrying arms 22 in such a way that the rotational axes of the supporting elements 24 are inclined forward in a slightly oblique manner with regard to the forward moving direction V of the apparatus 10 (not shown). As a result, a risk of jacking up of the main body 10 as a result of obstacles in front of the supporting elements 24 can be decreased. In addition, the cutting devices 20 can advantageously be raised slightly in the case of moving around bends or in the case of a reverse movement of the apparatus 10. An angle between a vertical axis of the apparatus 10 and a rotational axis of the supporting element 24 can lie, for example, in a range between 0° and 15°, preferably at approximately 5°.

Figure 5:
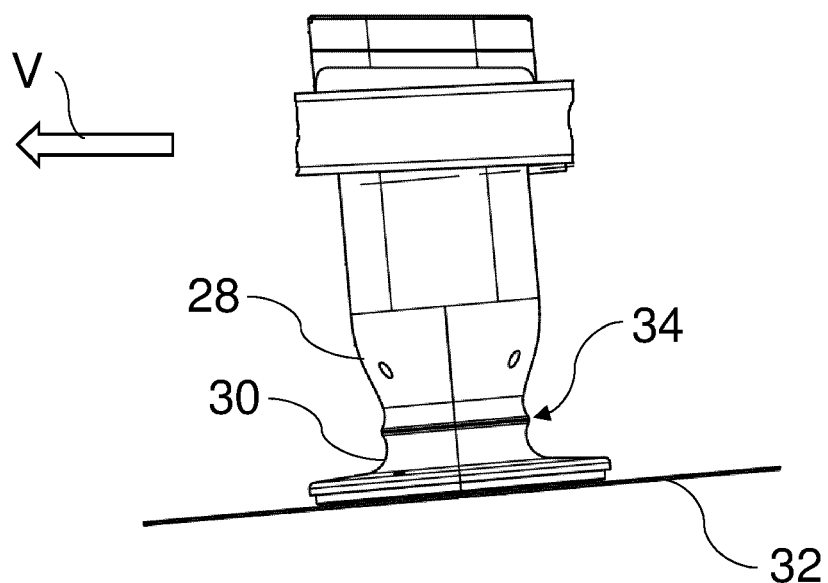
FIG. 5 shows a side view of a cutting device of the exemplary apparatus for mowing grass.

FIG. 5 shows by way of example one of the cutting devices 20 in detail which is described in the following text.

The cutting devices 20 can have a stationary part 28 and a rotatable part 30. For example, a preferably brushless electric motor for driving the rotatable part 30 can be arranged in the stationary part 28. The rotatable part 30 can have one or more cutting elements 32, for example cutting knives. In addition to the cutting elements 32, the figures also show a circular cutting region which is defined by way of said cutting elements 32. The stationary part 28 can be fastened to the carrying arm 22. The stationary part 28 can expediently carry the rotatable part 30 on an underside of the stationary part 28.

The cutting elements 32 can be rotated about a rotational axis of the respective cutting device 20. The rotational axis can run, for example, parallel or obliquely with respect to the vertical axis of the apparatus 10. The rotational axis is expediently inclined forward in a slightly oblique manner with regard to the forward moving direction V of the apparatus 10. As a result, cutting of the lawn takes place only in the front region of the cutting device 20, and not in the rear region in contrast. Therefore, the cutting elements 32 do not make contact with the lawn which has already been mown, or scarcely make contact with it, with the result that less (for example, electric) energy for driving the cutting elements 32 is necessary. An angle between a vertical axis of the apparatus 10 and a rotational axis of the cutting device 20 can lie, for example, in a range between 0° and 15°, preferably at approximately 5°.

The stationary part 28 and the rotatable part 30 are spaced apart from one another by way of a parting line 34. In order to prevent winding of cut blades of grass around the parting line 34, the parting line 34 is arranged in a region with a great external diameter. The external diameter can be, for example, 50 mm or more, with the result that a blade of grass would have to have a length of more than 150 mm, in order to be wound completely around the parting line 34, to become knotted and to jam the rotatable part 30. Permanent soiling can thus also be decreased. In order to position the parting line 34 in a region with a great external diameter, both the rotatable part 30 and the stationary part 28 widen toward the parting line 34. In other words, a region of the stationary part 28, which region adjoins the parting line 34, tapers in a direction away from the parting line 34. A region of the rotating part 30, which region adjoins the parting line 34, likewise tapers in a direction away from the parting line 34.

The apparatus 10 can optionally have a pivotable boom 36, as is shown in FIGS. 1 to 4 and 6 to 7. In the case of the use of the apparatus 10 in agricultural row crops, an area between the plants of a row can be mown by means of the boom 36. In the case of the use of the apparatus 10 on an open space, a cut width which is provided by way of the apparatus 10 can be increased by way of the boom 36.

Figure 6:
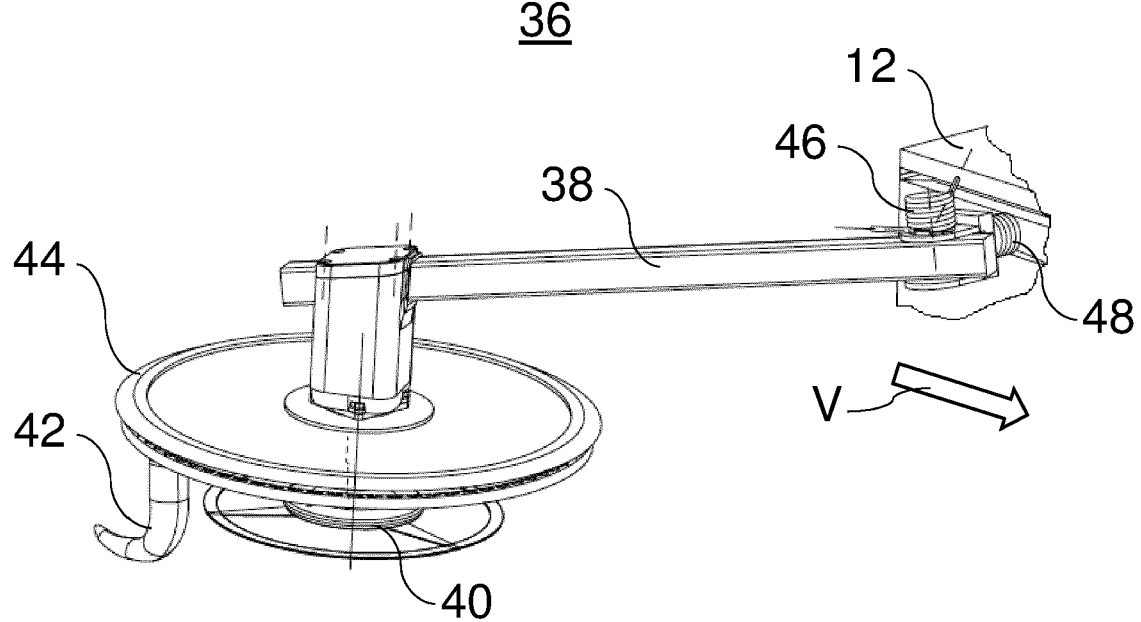
FIG. 6 shows a perspective view of a boom arm of the exemplary apparatus for mowing grass.

FIG. 6 shows the boom 36 in detail. The boom 36 is connected pivotably to the main body 12. The boom 36 can have a boom arm 38, a cutting device 40, a supporting element 42, a rolling element 44, a first prestressing element 46 and/or a second prestressing element 48.

The boom arm 38 is connected at one end to the main body 12 laterally such that it can be pivoted in and out. The boom arm 38 is prestressed by way of the first prestressing element 46 for pivoting out. The boom arm 38 can also be connected at this end to the main body 12 such that it can be pivoted up and down. The boom arm 38 is prestressed by way of the second prestressing element 48 for pivoting up, preferably for relieving the supporting element 42 and the underlying surface.

At an end which is opposite the pivot bearing, the boom arm 38 carries the cutting device 40. The cutting device 40 can be configured like the cutting devices 20 or in a similar manner to this. For example, the cutting device 40 can have one or more cutting elements which can be rotated about a rotational axis, the rotational axis being parallel or preferably inclined forward with regard to the forward moving direction V of the apparatus 10.

The supporting element 42 supports the boom arm 38 on the ground. For example, the supporting element 42 can be attached to a carrier element which is fastened to the stationary part of the cutting device 40. It is also possible that the supporting element 42 is attached directly to the boom arm 38. An up-and-down pivoting movement of the boom arm 38 (and therefore of the cutting device 40) follows a contour of the underlying surface as a result of the support of the boom arm 38 by means of the supporting element 42. The supporting element 24 can be arranged behind or preferably in front of the cutting device 40 with regard to the forward moving direction V of the apparatus 10. The supporting element 42 can be configured like the supporting elements 24 or in a similar manner to this. For example, the supporting element 42 can be configured as an expediently horn-shaped and/or curved runner. A vertical axis of the supporting element 24 can be parallel to the vertical axis of the apparatus 10 or oblique with respect thereto, preferably inclined slightly forward (not shown).

The rolling element 44 is mounted rotatably and is configured to roll or run on objects, for example trees or other plants. In this way, the object is firstly not damaged. In particular, for example, plant propagation locations on trees in fruit orchards can thus be protected. Secondly, mowing can be carried out by way of the cutting device 40 close to the object, and the boom arm 38 and the cutting device 40 can be guided by way of the rolling element 44. The rolling element 44 can be configured, for example, as a circular disk or as a circular ring, and can be mounted rotatably, for example on the cutting device 40 or the boom arm 38. The rolling element 44 can be arranged above the cutting device 40, and can have an external diameter which is greater than an external diameter of the cutting device 40.

It is possible that the apparatus 10 has the boom 36 only on one longitudinal side (as is shown) or on the two longitudinal sides of the apparatus 10.

Figure 7:
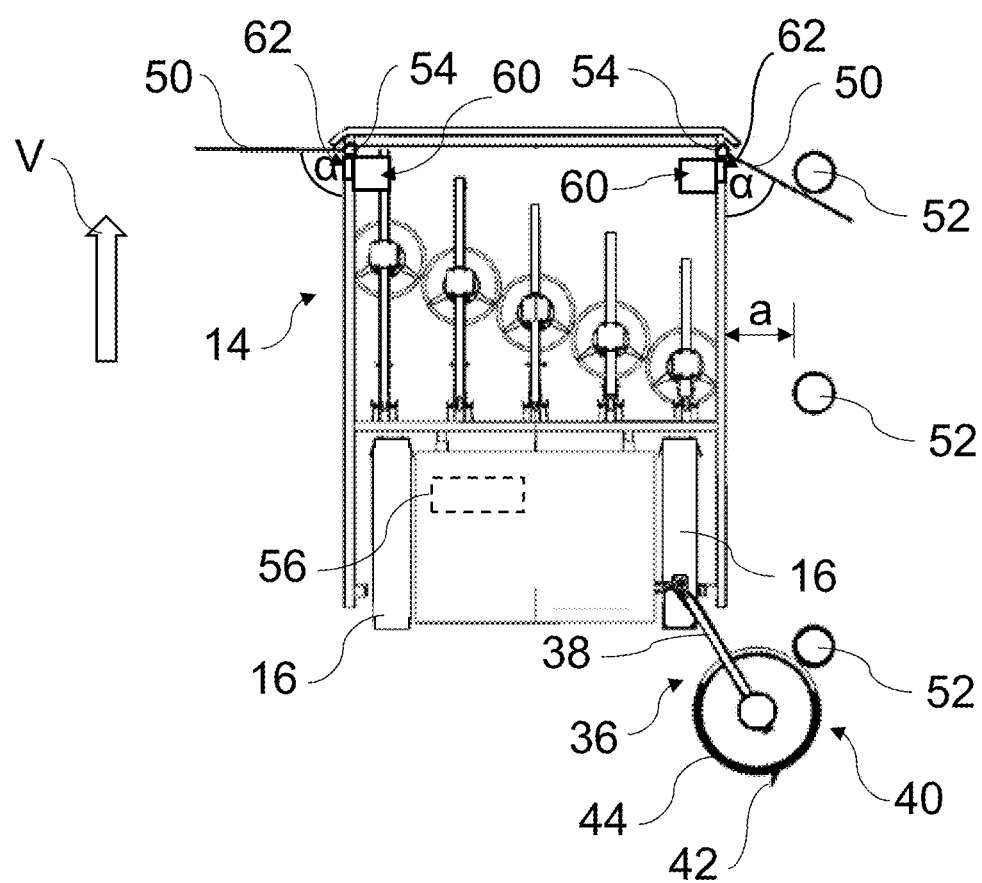
FIG. 7 shows a diagrammatic top view of a further apparatus for mowing grass in accordance with one exemplary embodiment of the present disclosure.

FIG. 7 shows a modified exemplary embodiment.

Here, the apparatus 10 has two optional lateral, tactile sensor arms 50. The sensor arms 50 can be pivoted in and out on the two longitudinal outer sides of the apparatus 10 for the tactile detection of a spacing a between the apparatus 10 and an object 52 next to the apparatus 10. The objects 52 can be, for example, a plant of an agricultural row crop.

It is also possible that the apparatus 10 has only one tactile sensor arm 50 on one of the two longitudinal outer sides. Furthermore, it is noted that the tactile sensor arm 50 might be used even in the case of other apparatuses, preferably for mowing grass, which other apparatuses differ from the apparatus 10. In particular, an apparatus for mowing grass can have the sensor arm 50 independently of a presence and/or a configuration of the mowing device 14.

The sensor arm 50 can be connected pivotably to the main body 12. The sensor arm 50 can be prestressed for pivoting out, for example by means of a spring. An end stop can be provided which limits maximum pivoting out of the sensor arm 50, for example to approximately 90° with respect to the longitudinal axis of the apparatus 10. Furthermore, a damping element (not shown) can be provided, in order to damp vibrations of the sensor arm 50 on the end stop. The damping element can be arranged on the sensor arm 50 or on the end stop.

An angle sensor 54 of the sensor arm 50 can be configured to detect an angle $\alpha$ between the sensor arm 50 and the main body 12. The angle sensor 54 can be configured, for example, as a rotary encoder in the form of a potentiometer. A control unit 56 of the apparatus 10 can determine the spacing a between the apparatus 10 and the object 52 (or the associated object row/plant row) from the known length of the sensor arm 50, the angle $\alpha$ which is detected by way of the angle sensor 54, and expediently an angular velocity of the pivoting movement of the sensor arm 50. In a manner which is based on the determined spacing a, the control unit 56 can be configured to navigate the apparatus 10. Thus, for example, a constant spacing from the object row consisting of the objects (plants) 52 can expediently be maintained during mowing. At the same time, it can thus be ensured that the cutting device 40 of the boom 36 also reaches the region between adjacent objects (plants) 52 of said object row.

It is also possible that, as an alternative to the spring prestress of the sensor arm 50, an electric drive 60 (for example, a brushless electric drive) is provided. The electric drive 60 can be configured, for example, as an electric gimbal drive. The electric drive 60 can be drive-connected to the tactile sensor arm 50 in order to pivot out the sensor arm 50. The control unit 56 can actuate the electric drive 60 by way of an actuating task which pro-vides, for example, for a pivoting angle $\alpha$ of 90° to be assumed. A conclusion can be made about the spacing a from the resulting regulating effort to assume the pivoting angle $\alpha$. An angle measurement can likewise also take place by means of the angle sensor 54. The use of the electric drive 60 can have the advantage that the sensor arms 50 can be used in a simple way during parking of the apparatus 10, and that a determination of the spacing a is possible even in the case of reverse moving. A mechanism 62, particularly preferably a, for example, single-stage planetary gear mechanism, a spur gear mechanism and/or a belt mechanism (for example, with a toothed belt), can be arranged (connected in drive terms) between the electric drive and the tactile sensor arm.

It is also possible that the sensor arm 50 can be utilized as a display unit or navigation element. For example, the sensor arm 50 might indicate by way of orientation in a defined direction where the apparatus 10 is to move after starting, in order to reduce uncertainties of the user. The sensor arm 50 can also be utilized as an input unit, in order to guide the apparatus 10 manually, for example, the apparatus 10 driving itself in the process, for example. In this way, the apparatus can be accompanied in a guided manner from one location to another location, for example when crossing a street.

The apparatus 10 can have further components which are not described in greater detail here. These include, for example, one or more chain curtains and/or other protected trim parts for shielding the mowing device 14, the cutting devices 20 and/or the cutting device 40. An electric energy store can expediently also be arranged in the main body 12, which electric energy store can be charged at a stationary or mobile charging station and supplies the electric systems of the apparatus 10 with electric energy. It is also possible that further sensors for navigating the apparatus are provided, for example touch-sensitive sensors (for example, pressure sensitive bumpers) on a front side, a rear side and/or the longitudinal outer sides of the apparatus 10. The apparatus 10, preferably the main body 12, can expediently have further systems for navigation of the apparatus 10, for example a satellite-supported position determining apparatus (for example, DGPS) and/or a compass. Furthermore, the control unit 56 can use methods of odometry for the estimation of the position and/or location of the apparatus 10.

The invention is not restricted to the above-described preferred exemplary embodiments. Rather, a multiplicity of variants and modifications are possible which likewise utilize the concept of the invention and therefore fall within the scope of protection. In particular, the invention also claims protection for the subject matter and the features of the subclaims independently of the claims which are referred to. In particular, the individual features of independent claim 1 are disclosed in each case independently of one another. In addition, the features of the subclaims are also disclosed independently of all the features of independent claim 1 and, for example, independently of the features with regard to the presence and/or the configuration of the cutting devices, the carrying arms and/or the supporting elements of independent claim 1. All the range specifications herein are to be understood to be disclosed in such a way that, as it were, all the values which fall within the respective range are disclosed individually, for example also as respective preferred narrower outer limits of the respective range.

LIST OF DESIGNATIONS

10 Apparatus for mowing grass
12 Main body
14 Mowing device
16 Drive element
18 Crossmember
20 Cutting device
22 Carrying arm
24 Supporting element
26 Prestressing element
28 Stationary part
30 Rotatable part
32 Cutting element
34 Parting line
36 Boom
38 Boom arm
40 Cutting device
42 Supporting element
44 Rolling element
46 First prestressing element
48 Second prestressing element
50 Sensor arm
52 Object
54 Angle sensor
56 Control unit
60 electric/gimbal drive
62 gear/belt mechanism
V Forward moving direction
a Spacing
α Pivoting angle

The invention claimed is:

1. An apparatus for mowing grass, having:
a plurality of cutting devices for mowing the grass;
a plurality of carrying arms which are arranged offset with respect to one another with regard to a transverse axis of the apparatus, and are mounted such that they can be pivoted up and down in each case individually, and carry in each case one of a plurality of cutting devices; and
a plurality of supporting elements which support in each case one of the plurality of carrying arms on an underlying surface, and are arranged in front of the respective cutting device with regard to a forward moving direction of the apparatus.

2. The apparatus as claimed in claim 1:
the plurality of supporting elements being configured as runners.

3. The apparatus as claimed in claim 1:
the plurality of supporting elements being connected rotatably to the respective carrying arm,
a respective rotational axis of the plurality of supporting elements running parallel or obliquely with respect to a vertical axis of the apparatus in a manner which is inclined forward with regard to the forward moving direction.

4. The apparatus as claimed in claim 1, having, furthermore:
a main body or frame, on which the plurality of carrying arms are mounted such that they can be pivoted up and down in each case individually, and to which drive elements, including wheels or caterpillar drives, are attached which are drive-connected to a drive unit of the apparatus.

5. The apparatus as claimed in claim 1:
wherein pivot bearings and the plurality of supporting elements are arranged in each case on opposite end regions of the plurality of carrying arms.

6. The apparatus as claimed in claim 1:
the plurality of cutting devices having in each case at least one cutting element which can be rotated about a cutting axis of the respective cutting device, the cutting axis running obliquely with regard to a vertical axis of the apparatus in a manner which is inclined forward with regard to the forward moving direction.

7. The apparatus as claimed in claim 1:
the plurality of cutting devices in each case having a stationary part and a rotatable part which are spaced apart from one another by way of a parting line;
a region of the stationary part, which region adjoins the parting line, tapering in a direction away from the parting line; and
a region of the rotatable part, which region adjoins the parting line, tapering in a direction away from the parting line.

8. The apparatus as claimed in claim 1, having, furthermore:
a plurality of carrying arm prestressing elements, including springs, which are assigned to in each case one of the plurality of carrying arms and prestress the respective carrying arm for pivoting up, and relieving the respective supporting element or the underlying surface.

9. The apparatus as claimed in claim 1, having, furthermore:
at least one tactile sensor arm which is arranged such that it can be pivoted in and out, on a longitudinal outer side of the apparatus for the tactile detection of a spacing (a) between the apparatus and an object next to the apparatus,
in each case one tactile sensor arm is included on the two longitudinal outer sides of the apparatus.

10. The apparatus as claimed in claim 9, having, furthermore:
at least one sensor arm prestressing element which prestresses the at least one tactile sensor arm for pivoting out; and
an electric drive, including an electric gimbal drive, which is drive-connected to the at least one tactile sensor arm for pivoting out the at least one tactile sensor arm, a mechanism, including a single-stage planetary gear mechanism, a spur gear mechanism and a belt mechanism, being arranged between the electric drive and the tactile sensor arm.

11. The apparatus as claimed in claim 9, having, furthermore:
an angle sensor which is configured to detect a pivoting angle of the at least one tactile sensor arm.

12. The apparatus as claimed in claim 9, having, furthermore:
a control unit which is configured to determine the spacing from the object in a manner which is based on a pivoting angle of the at least one tactile sensor arm or an angular velocity of a pivoting movement of the at least one tactile sensor arm,
the control unit being configured, furthermore, to navigate the apparatus in a manner which is based on the determined spacing.

13. The apparatus as claimed in claim 1, having, furthermore:
at least one boom which can be pivoted in and out on the longitudinal outer side of the apparatus, and has a further cutting device for mowing grass,
the at least one boom being prestressed for pivoting out; or
the at least one boom having a rotatable rolling element which is circular for rolling on objects next to the apparatus.

14. The apparatus as claimed in claim 13:
the rolling element being arranged above the further cutting device and having an external diameter which is greater than an external diameter of the further cutting device.

15. The apparatus as claimed in claim 13:
the boom additionally being mounted such that it can be pivoted up and down, the boom having a further supporting element including a runner for supporting the boom on the underlying surface, and being prestressed for pivoting up.

16. The apparatus of claim 1, wherein the apparatus includes an autonomous robot apparatus.

17. The apparatus of claim 2, wherein the runners are at least one of horn-shaped and curved.

* * * * *